United States Patent Office 3,705,930
Patented Dec. 12, 1972

3,705,930
TRITHIOLPHOSPHORIC ACID ESTERS
Hanshelmut Schlor and Hellmut Hoffmann, Wuppertal-Elberfeld, Erik Regel, Wuppertal-Cronenberg, and Hans Scheinpflug, Leverkusen, Germany, assignors to Farbenfabriken Bayer Aktiengesellschaft, Leverkusen, Germany
No Drawing. Filed Apr. 22, 1970, Ser. No. 30,965
Claims priority, application Germany, May 6, 1969,
P 19 22 928.8
Int. Cl. A01n 9/36; C07f 9/16
U.S. Cl. 260—964
8 Claims

ABSTRACT OF THE DISCLOSURE

S-monoalkyl-S,S-diphenyl- or S,S-dialkyl-S-phenyl-trithiolphosphoric acid esters in which each alkyl group has from 1 to 4 carbon atoms, e.g., S-methyl (or -ethyl, -propyl, -butyl)-S,S-diphenyltrithiolphosphoric acid ester, S,S-dimethyl (or -diethyl, -di-propyl, di-butyl-)phenyltrithiolphosphoric acid ester, have exceptional fungicidal activity, especially against rice pathogens, and further exhibit insecticidal and acaricidal effectiveness.

---

The present invention relates to and has for its objects the provision of particular new trithiolphosphoric acid esters, specifically S-alkyl-S,S-diphenyltrithiolphosphoric acid esters and S,S-dialkyl-S-phenyltrithiolphosphoric acid esters, which possess exceptional fungicidal activity and insecticidal and acaricidal activity; pesticidal compositions in the form of mixtures of such compounds with solid and liquid dispersible carrier vehicles; processes of producing these novel compounds and methods of using such compounds as pesticides, especially as fungicides, insecticides, and acaricides, with other and further objects becoming apparent from the instant specification and examples.

It is known that certain S-arylthiolphosphoric acid esters exhibit fungicidal activity; such compounds are said to be suitable especially as fungicides for the control of brown rot (Sclerotina fructiola) and early blight of potato (Alternaria solani), see U.S. Patent No. 2,690,450. It is, however, not indicated by this U.S. Patent whether the products there disclosed possess a practically significant effectiveness against fungal pathogenic agents on rice plants, particularly Piricularia oryzae.

It has now been found, in accordance with the present invention, that trithiolphosphoric acid esters of the general formula

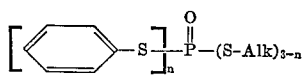
(I)

wherein

Alk is straight-chain or branched alkyl of from 1 to 4 carbon atoms, and
n is an integer from 1 to 2.

These compounds have surprisingly been found to possess strong fungicidal properties as well as an insecticidal and acaricidal activity. They are distinguished in particular by an outstanding effectiveness against fungal pathogens on rice plants. Advantageously, the trithiolphosphoric acid esters according to the invention are distinguished by a considerably better fungicidal activity than the known S-arylthiolphosphoric acid esters of analogous constitution and the same type of activity. The substances according to the invention therefore represent a valuable enrichment of the art. In addition, the present materials exhibit low phyto-toxicity and low mammalian toxicity rendering them eminently suitable as plant-protective agents.

It has furthermore been found, in accordance with the present invention, that the particular new compounds of Formula I, above, may be produced by a process which comprises reacting a dithiolphosphoric acid ester halide of the general formula

(II)

wherein

R is phenyl or straight-chain or branched alkyl of from 1 to 4 carbon atoms, and
Hal is halogen, preferably chlorine or bromine with a thiol compound of the general formula $$HS-R'$$
(III)

wherein

R' is a phenyl radical if R is alkyl, or if R is phenyl, R' is straight-chain or branched alkyl of from 1 to 4 carbon atoms.

The process is carried out in the presence of an acid-binding agent or by use of the starting materials in the form of their alkyl metal salts.

If, for example, S,S-diphenyldithiolphosphoric acid ester chloride and ethyl mercaptan are used as starting materials, the reaction course can be represented by the following formula scheme:

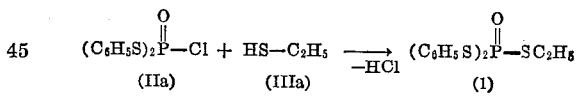

The dithiolphosphoric ester halides to be used in the process according to the invention are defined generally by the Formula II stated above and the thiol (mercapto) starting material is defined generally by Formula III, above.

Advantageously, in accordance with the present invention, in the various formulae herein, R is phenyl or methyl, ethyl, n-propyl, iso-propyl, n-butyl, sec.-butyl or tert.-butyl.

As specifically exemplary of suitable dithiolphosphoric acid ester halides, there may be listed: S,S-diphenyl-, S,S-dimethyl-, S,S-diethyl-, S,S-n-dipropyl, S,S-di-isopropyl-, S,S-di-n-butyl-, S,S-di-sec.-butyl-, S,S-di-tert.-butyldithiolphosphoric acid ester chloride as well as the corresponding bromides; it being understood that, when the ester halide is S,S-diphenyldithiolphosphoric acid ester, R' in the thiol (III) is alkyl.

The dithiolphosphoric acid ester halides and thiol compounds of the Formulae II and III to be used as starting materials are known in the art.

The reaction is preferably carried out in the presence of a solvent (this term includes a mere diluent). As such, practically all inert organic solvents are suitable. Preferred solvents include aromatic hydrocarbons (which may be halogenated), such as benzene, benzine fractions, toluene, xylene and chlorobenzene; ethers, such as diethyl ether, di-n-butyl ether, dioxane and tetrahydrofuran; low-molecular-weight aliphatic ketones and nitriles, such as acetone, methylethyl ketone, methylisobutyl ketone, acetonitrile and propionitrile.

As acid acceptors, all conventional acid-binding agents can be used. Particularly suitable have proved to be alkali metal alcoholates, such as sodium and potassium methylate or ethylate, alkali metal carbonates, for example, sodium and potassium carbonate; tertiary aliphatic, aromatic and heterocyclic amines, for example triethylamine, dimethylaniline, dimethylbenzylamine and pyridine.

The reaction temperatures can be varied within a fairly wide range. In general, the reaction is carried out at from 0 to 60° C., preferably at from 10 to 30° C.

The reaction can proceed under normal pressure.

In carrying out the process, equimolar amounts of the starting components may be reacted in one of the above-mentioned solvents in the presence of the acid-binding agent. The use of an excess of one or other of the reactants affords no particular advantages.

After stirring of the reaction mixture for several hours at elevated temperature, the reaction product mixture is extracted with water, the organic phase is separated, dried and "slightly distilled," that is, the solvent is first evaporated off and the residue is then briefly heated to slightly to moderately elevated temperatures under greatly reduced pressure and so freed from the last volatile impurities.

The refractive index and elementary analysis enable the compounds to be characterized, especially those which cannot be distilled. The compounds are mostly obtained in oil form.

Advantageously, the active compounds according to the present invention exhibit in particular a strong fungitoxic activity. In the concentrations necessary for the control of fungi, they do not damage cultivated plants and they have a low toxicity to warm-blooded animals. For these reasons, the new products are suitable as crop protection agents for the control of fungi and can be used in particular against Archimycetes, Phycomycetes, Ascomycetes, Basidiomycetes and Fungi Imperfecti.

The active compounds according to the invention have a broad spectrum of activity and can be applied against parasitic fungi which infest above-the-soil parts of plants, fungi which cause tracheomycosis, which attack the plant from the soil, seed-borne pathogens and soil-inhibiting fungi.

The active compounds according to the invention have given good results especially in the control of rice diseases. Thus, they show an excellent activity against the fungus *Piricularia oryzae*. Surprisingly, the active compounds possess not only protective, that is, prophylactic, action, but also a curative effect.

The active compounds according to the instant invention can be utilized, if desired, in the form of the usual formulations or composition with conventional inert (i.e. plant compatible or herbicidally inert) pesticide diluents or extenders, i.e., diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powder, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chloro-benzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, acaricides, insecticides or herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In the case of certain modes of application, concentrated active compound preparations may also be used, for example containing 5–60% by weight of active compound.

Furthermore, the present invention contemplates methods of selectively killing, combating or controlling pests, e.g. fungi and arthropods, i.e. insects and acarids, and more particularly methods of combating pests which comprise applying to at least one of correspondingly (a) such fungi (b) such arthropods and (c) the corresponding habitat, i.e. the locus to be protected, a correspondingly combative or toxic amount, i.e. a fungicidally effective or arthropodicidally toxic amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

The invention also provides crops, especially rice crops, protected from damage by fungi by being grown in areas in which, immediately prior to and/or during the time of the growing, a compound according to the invention was applied alone or in admixture with a solid or liquid diluent or carrier.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated, without limitation, by the following examples:

EXAMPLE 1

Piricularia tests (liquid preparation of active compound)

Solvent: 4 parts by weight acetone
Dispersing agent: 0.05 part by weight sodium oleate
Water: 95.75 parts by weight
Other additive: 0.2 part by weight gelatin (i) Protective fungicidal action.—The amount of the particular active compound required for the desired final concentration of such active compound in the spray liquor is mixed with the stated amount of solvent, and the resulting concentrate is then diluted with the stated amount of water containing the stated dispersing agent and other additive.

Thirty rice plants about 14 days old, are sprayed with the given spray liquor until dripping wet. The plants remain in a greenhouse at temperatures of 22 to 24° C. and a relative atmospheric humidity of about 70% until they are dry. They are then inoculated with an aqueous suspension of 100,000 to 200,000 spores/ml. of *Piricularia oryzae* and placed in a chamber kept at 24 to 26° C. and 100% relative atmospheric humidity.

Five days after inoculation, the infestation of all the leaves present at the time of inoculation with *Piricularia oryzae* is determined as a percentage of the untreated but also inoculated control plants. 0% means no infestation; whereas 100% means that the infestation is exactly as great as in the case of the control plants.

(ii) Additional test/curative fungicidal action.—In order to ascertain the curative fungicidal action, the above test (i) is repeated, except that the given action compound is applied not before, but only 16 hours after, inoculation.

The particular active compounds tested, their concentrations, and the results obtained for tests (i) and (ii) can be seen from the following Table 1.

TABLE 1.—PIRICULARIA TEST (LIQUID PREPARATION OF ACTIVE COMPOUND)
[pr=protective; cur=curative]

| Active compound | | Infestation as a percentage of the infestation of the untreated control with a concentration of active compound of — | |
|---|---|---|---|
| | | 0.05% | 0.025% |
| $(C_2H_5O)_2\overset{O}{\overset{\|}{P}}-S-\langle\bigcirc\rangle-NO_2$ | pr | 0 | 75 |
| | cur | 100 | |
| Comparative preparation known from U.S. Patent 2,690,450 | | | |
| $(C_2H_5-S)_2\overset{O}{\overset{\|}{P}}-S-\langle\bigcirc\rangle$ | pr | 0 | 0 |
| | cur | 25 | 50 |
| $(n-C_4H_9-S)_2\overset{O}{\overset{\|}{P}}-S-\langle\bigcirc\rangle$ | pr | 0 | 0 |
| | cur | 0 | 17 |
| 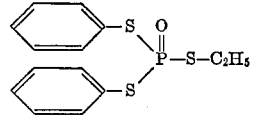 | pr | 0 | 0 |
| | cur | 0 | 25 |
| $(CH_3-S)_2\overset{O}{\overset{\|}{P}}-S-\langle\bigcirc\rangle$ | pr | 0 | 0 |
| | cur | 50 | |
| 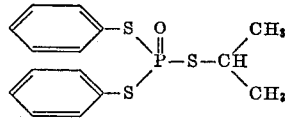 | pr | 0 | 0 |
| | cur | 0 | 25 |

EXAMPLE 2

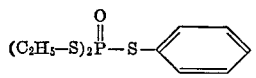

90 grams of S,S-diphenyldithiolphosphoric acid ester chloride dissolved in 300 ml. benzene were stirred together with 22 grams of ethyl mercaptan and 31 grams of trimethylamine at 20 to 25° C. for 3 hours. The mixture was then extracted with water, the benzene phase was separated and dried and the residue was "slightly distilled." The yield of the resulting S-ethyl-S,S-diphenyltrithiolphosphoric acid ester was 54 grams (56% of the theory).

EXAMPLE 3

$\langle\bigcirc\rangle-S\diagdown\overset{O}{\overset{\|}{P}}-S-CH\diagup^{CH_3}_{CH_3}$
$\langle\bigcirc\rangle-S\diagup$ Preparation was carried out as described in Example 1, but with the use of isopropyl mercaptan in place of ethyl mercaptan. The yield of the resulting S-isopropyl-S,S-diphenyl-trithiolphosphoric acid ester was 64% of the theory.

Refractive Index: $n_D^{24}=1.6378$

*Analysis* for $C_{15}H_{17}OS_3P$ (molecular weight=340).— Calculated (percent): P, 9.1%. Found (percent): P, 8.42.

EXAMPLE 4

$(C_2H_5-S)_2\overset{O}{\overset{\|}{P}}-S-\langle\bigcirc\rangle$

To a solution of 51 grams of S,S-diethyldithiolphosphoric acid ester chloride in 100 ml. benzene there was added dropwise at 10 to 20° C. a mixture of 27.5 grams of thiophenol and 0.25 mole of alcoholic solution of sodium methylate. The reaction mixture was subsequently stirred at room temperature for 3 to 4 hours, then poured into water. The benzene phase was then separated and dried and the residue was slightly distilled.

The yield of the resulting S,S-diethyl-S-phenyltrithiolphosphoric acid ester was 62 grams.

Analysis for $C_{10}H_{15}OPS_3$ (molecular weight=278).— Calculated (percent): P, 11.14; S, 34.5. Found (percent): P, 11.62; S, 33.89.

EXAMPLE 5

In an analogous manner to that of Example 4, the following compound can be prepared:

S,S-dimethyl-S-phenyltrithiolphosphoric acid ester

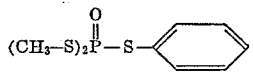

Yield: 76% of the theoretical
Refractive Index: $n_D^{22}$
Analysis for $C_8H_{11}OS_3P$ (molecular weight=250).— Calculated (percent): P, 12.4. Found (percent): P, 12.14.

EXAMPLE 6

In a manner analogous to that of Example 4, the following compound can be prepared:

S,S-di-n-butyl-s-phenyltrithiolphosphoric acid ester

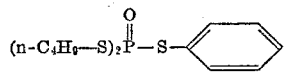

Yield: 92% of the theoretical
Analysis.—$C_{14}H_{23}OPS_3$ (molecular weight=334).— Calculated (percent): P, 9.28; S, 28.75. Found (percent): P, 9.55; S, 28.13.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phyto-toxicity, enabling such compounds to be used with correspondingly favorable compatibility with respect to warm-blooded creatures and plants for more effective control and/or elimination of fungi by application of such compounds to such fungi and/or their habitat. Furthermore, the insecticidal and acaricidal action of the instant compounds can be advantageously utilized analogously by applying the compounds to insects, acarids and/or their habitat.

It will be appreciated that the instant specification and examples are set forth by way of illustration and not limitation, and that various modifications and changes may be made without departing from the spirit and scope of the present invention.

What is claimed is:

1. Trithiolphosphoric acid ester of the general formula

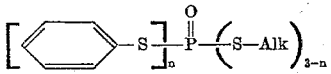

wherein

Alk is straight-chain or branched alkyl of from 1 to 4 carbon atoms; and
$n$ an integer from 1 to 2.

2. Compound according to claim 1, of the formula

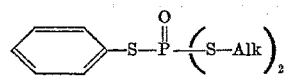

wherein

Alk is straight-chain or branched alkyl of from 1 to 4 carbon atoms.

3. Compound according to claim 1, for the formula

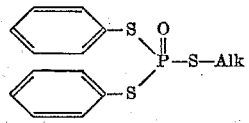

wherein

Alk is straight-chain or branched alkyl of from 1 to 4 carbon atoms.

4. Compound according to claim 1 wherein such compound is S,S-diethyl-S-phenyltrithiolphosphoric acid ester of the formula

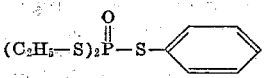

5. Compound according to claim 1 wherein such compound is S,S-di-n-butyl-S-phenyltrithiolphosphoric acid ester of the formula

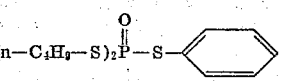

6. Compound according to claim 1 wherein such compound is S-isopropyl-S,S-diphenyltrithiolphosphoric acid ester, of the formula

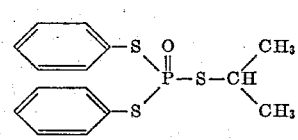

7. Compound according to claim 1 wherein such compound is S,S-dimethyl-S-phenyltrithiolphosphoric acid ester of the formula

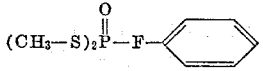

8. Compound according to claim 1 wherein such compound is S-ethyl-S,S-diphenyltrithiolphosphoric acid ester of the formula

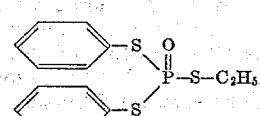

References Cited
UNITED STATES PATENTS

| | | | |
|---|---|---|---|
| 3,218,145 | 11/1965 | Goyette | 260—964 X |
| 3,463,836 | 8/1965 | Aichenegg | 260—965 X |
| 3,518,261 | 6/1970 | Nguyen et al. | 260—964 X |

LEWIS GOTTS, Primary Examiner
R. L. RAYMOND, Assistant Examiner

U.S. Cl. X.R.
260—965, 972; 424—225